United States Patent [19]
Jaszczak et al.

[11] Patent Number: 5,289,008
[45] Date of Patent: Feb. 22, 1994

[54] METHOD AND APPARATUS FOR ENHANCED SINGLE PHOTON COMPUTED TOMOGRAPHY

[75] Inventors: Ronald J. Jaszczak; David R. Gilland, both of Chapel Hill, N.C.

[73] Assignee: Duke University, Durham, N.C.

[21] Appl. No.: 896,395

[22] Filed: Jun. 10, 1992

[51] Int. Cl.$^5$ .............................................. G01T 1/166
[52] U.S. Cl. ........................... 250/363.03; 250/363.04; 250/363.09
[58] Field of Search ...................... 250/363.04, 363.03, 250/363.09; 378/901

[56] References Cited

U.S. PATENT DOCUMENTS

| | | | |
|---|---|---|---|
| 4,582,995 | 4/1986 | Lim et al. | 250/363.07 |
| 4,670,657 | 6/1987 | Hawman et al. | 250/505.1 |
| 4,752,691 | 6/1988 | Hawman | 250/363.1 |
| 4,820,924 | 4/1989 | Hsieh | 250/363.1 |
| 4,823,017 | 4/1989 | Hsieh | 250/363.03 |
| 5,001,347 | 3/1991 | Hsieh | 250/363.1 |
| 5,032,728 | 7/1991 | Chang et al. | 250/363.04 |
| 5,036,530 | 7/1991 | DiGiovanna et al. | 378/208 |
| 5,047,641 | 9/1991 | Besseling et al. | 250/363.08 |
| 5,055,687 | 10/1991 | Ichihara | 250/363.09 |
| 5,075,554 | 12/1991 | Yunker et al. | 250/363.08 |

FOREIGN PATENT DOCUMENTS

| | | |
|---|---|---|
| 0444324 | 9/1991 | European Pat. Off. |
| 0465952 | 1/1992 | European Pat. Off. |
| 63-277985 | 11/1987 | Japan |
| 91/00048 | 1/1991 | World Int. Prop. O. |

OTHER PUBLICATIONS

Non–Uniform Attenuation Correction Using Simultaneous Transmission And Emission Converging Tomography; Tung, et al. [relevant pages, date and place of publication Not identified].

*Primary Examiner*—Constantine Hannaher
*Attorney, Agent, or Firm*—Bell, Seltzer, Park & Gibson

[57] ABSTRACT

Disclosed is a method and apparatus for single photon emission computed tomography of a test region having a plurality of projectional views utilizing a radiation source opposite said test region from a radiation detector, comprising detecting emission radiation from a first projectional view of a test region, irradiating the test region to transmit radiation through the test region, and detecting both emission and transmission radiation from the first projectional view of the test region. The emission detection, irradiation and emission and transmission steps are then repeated for a second projectional view. This emission and transmission data may then be used to produce compensated emission data for the test region.

6 Claims, 1 Drawing Sheet

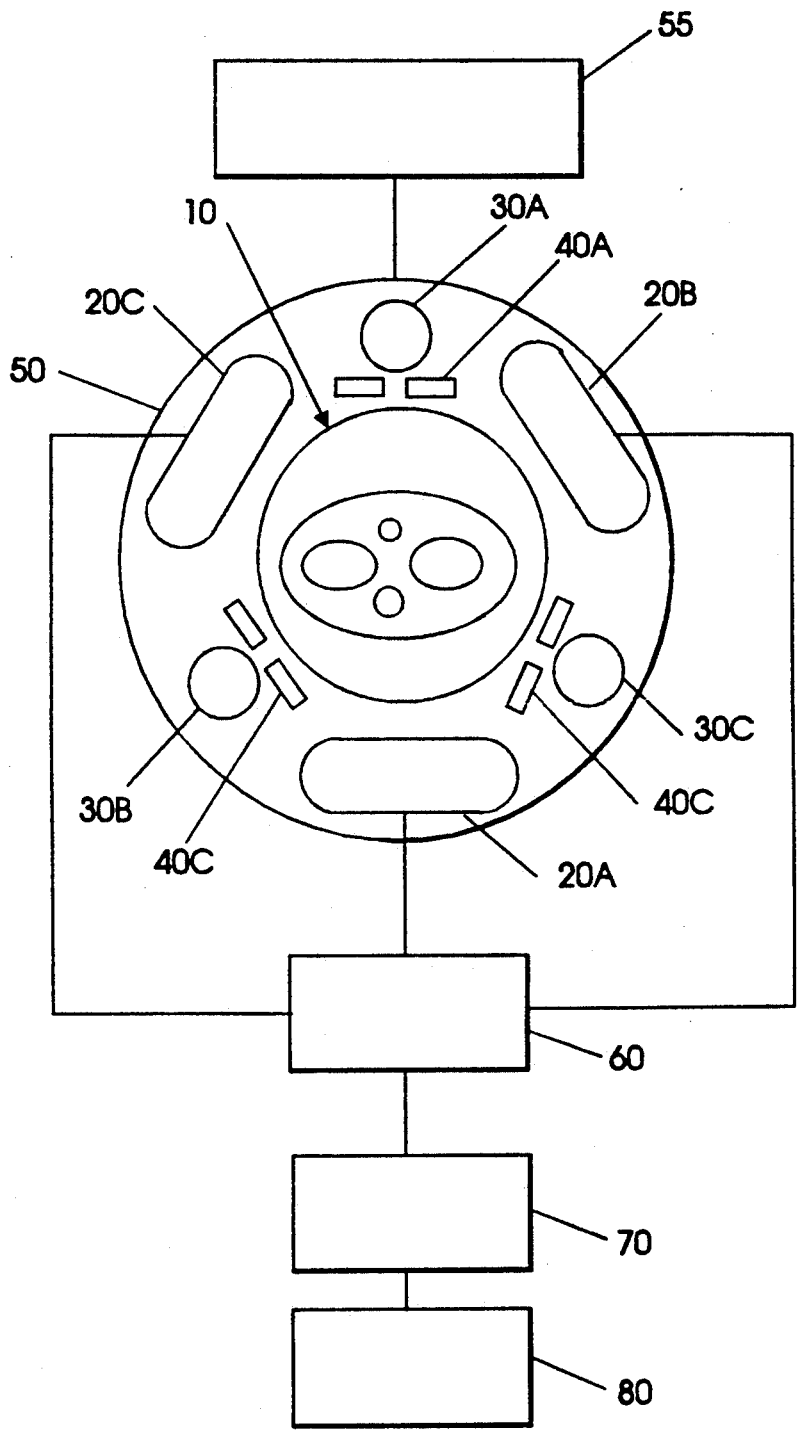

METHOD AND APPARATUS FOR ENHANCED SINGLE PHOTON COMPUTED TOMOGRAPHY

This invention was made with Government support under Grant No. DEFG05-89ER60894 awarded by the National Institutes of Health. The Government has certain Rights to this Invention.

FIELD OF THE INVENTION

The present invention relates to nuclear medicine. More particularly, the present invention relates to single photon computed tomography for medical applications, including improved methods and apparatus for compensating for varying density in the test subject.

BACKGROUND OF THE INVENTION

One type of emission tomographic system employed in diagnostic medicine is the single photon emission computed tomography (SPECT) system in which a low-level gamma ray emitter is injected into the body of a patient. The gamma ray emitter is conventionally of a type which preferentially travels to an organ whose image is to be produced. A large-area planar gamma ray detector detects gamma rays emitted from the body normal to its plane. This information is digitally stored as an image in an M by N array of elements called pixels. The values of M and N are conventionally equal to each other, and are commonly 64 or 128 units, or pixels, across the two dimensions of the image.

A SPECT system employs a plurality of views each taken by positioning a detector parallel to, and at an angle about a fixed axis. The angle is incremented in equal steps between views The images thus captured are computer-processed to construct pictures of transaxial slices of the body.

In order to minimize the radiation dosage to which the patient is exposed, the injected gamma ray materials are of relatively low radioactivity. As a consequence, each view requires a substantial time such as, for example, about 40 seconds, to produce. If a total of 64 views on a 360-degree arc is desired, angularly spaced apart by about 5.6 degrees, then the entire imaging process takes about 40 minutes to complete. Blurring or distortion can take place when the body being imaged moves a distance on the order of one image pixel. A typical image pixel is about one-half centimeter square. Keeping a human body still to within one-half centimeter for 40 minutes is difficult, if not impossible. Thus, body motion and resultant image degradation are common.

To further complicate the problem, the emission of the gamma rays from the body is not uniform and depends upon the density of the material through which the radiation passes. If uniform attenuation of the material is assumed then incorrect quantitative measurement can result. Two methods have been described to compensate for this attenuation problem caused by varying density in the test subject Both methods use transmission computed tomography (TCT) to compensate for the variations in density.

The first method utilizes a transmission study which is performed prior to the emission study to determine the distribution of attenuation coefficients to apply to the emission data to compensate for attenuation variations. By performing the transmission study prior to the emission study the scan time is doubled and the problem of misregistration caused by patient movement increases.

The second method utilizes simultaneous measurement of transmission information and emission information to determine the distribution of attenuation coefficients. This method utilizes two different sources of radiation which must be discriminated between to properly isolate the transmitted radiation from the emitted radiation. This discrimination is difficult to perform and the emission data is often distorted by the transmitted radiation. Furthermore, the effects of backscattered radiation can further influence the emitted radiation values. Finally, the simultaneous method requires the use of two distinct radioisotopes thus requiring compensation for variations in attenuation based upon energy variations in the radiation.

Accordingly, it is an object of the present invention to provide a method and apparatus to compensate for the attenuation variations in a test subject while minimizing the time to perform such compensation and to compensate for the variations in attenuation in a subject without affecting the emitted radiation measurements.

SUMMARY OF THE INVENTION

A first aspect of the invention is a method for single photon emission computed tomography of a test region having a plurality of projectional views utilizing a radiation source opposite said test region from a radiation detector, comprising detecting emission radiation from a first projectional view of a test region, irradiating the test region to transmit radiation through the test region, and detecting both emission and transmission radiation from the first projectional view of the test region. This emission and transmission data may then be used to produce compensated emission data for the test region.

A further aspect of the invention is a single photon emission computed tomography system for detecting radiation emitted from a test region having a plurality of projectional views, comprising radiation detector means for receiving and converting to data the radiation emitted from one of the plurality of projectional views of the test region, radiation source means opposite the test region from the radiation detector means for irradiating the projectional view of the test area with radiation, shutter means operably associated with the radiation source means for selectively providing radiation to the projectional view of the test area, scanning means operably associated with the radiation detector means and the shutter means for selecting the projectional views of the test region and alternatingly providing the radiation to said selected projectional view and conversion means for converting data from the radiation detector means into transmission data and emission data.

BRIEF DESCRIPTION OF THE DRAWING

The FIGURE provides a schematic representation of the apparatus of the present invention.

DETAILED DESCRIPTION OF THE PREFERRED EMBODIMENTS

Although the present invention may be employed in other types of imaging systems such as, for example, in positron emission tomography (PET) or X-ray computed tomography imaging, for concreteness of description the following disclosure is directed toward the invention in the environment of a single photon emission tomographic (SPECT) system.

One embodiment of the present invention is illustrated in the FIGURE. As seen in therein, a test region 10 is comprised of elements of various densities which cause varying attenuation of radiation. In a typical application of the present invention, the test region is a human patient who has been administered a radioactive substance which migrates to the area of the body of interest. The test region 10 is divided into a plurality of projectional views by the field of view of the radiation detectors 20A through 20C. One projectional view of the test region 10 corresponds to that area of the test region from which the radiation detector 20A receives radiation. As seen in the FIGURE, each radiation detector 20A through 20C divides the test region 10 into a separate projectional view. Suitable radiation detectors, such as the gamma cameras utilized in the PRISM 3000 TM SPECT system (Ohio Imaging of Picker International, Bedford Heights, Ohio), are known to one of skill in the art. The output of the radiation detectors may be either digital or analog and reflects the intensity of the radiation received by that unit. Preferably the radiation detectors utilize fan beam collimators when a line source of radiation is used.

Opposite the test region 10 from the radiation detector 20A through 20C are radiation sources 30A through 30C. These radiation sources are preferably collimated line sources. Other sources of radiation known to one of skill in the art may be utilized. The radiation source 30A is positioned such that radiation from the source 30A is incident upon radiation detector 20A after passing through the projectional view of the test region 10 corresponding to the field of view of radiation detector 20A. In a similar fashion, radiation from radiation source 30B is incident upon radiation detector 20B and radiation from radiation source 30C is incident upon radiation detector 20C. The positioning of these radiation sources 30A through 30C may be as that illustrated in U.S. Pat. No. 5,055,687, issued to Ichihara, the disclosure of which is incorporated herein by reference in its entirety and as also illustrated in the FIGURE. Preferably, the radiation source is a line source comprising a glass or metal capillary tube of 1 mm inner diameter or less, filled with radioisotope positioned at the focal line of the fan beam collimator of the respective radiation detector. This is typically 100 cm or more from the collimator face.

Also shown in the FIGURE are shutters 40A through 40C, corresponding to radiation sources 30A through 30C. These shutters control whether radiation is transmitted from the corresponding radiation source through the test region to the radiation detectors. When the shutters are closed, no radiation is transmitted through the test region. When the shutter are open, radiation is transmitted through the test region. Shutters of the type described in U.S. Pat. No. 5,055,687 may be utilized in the present invention. Other methods known to one of skill in the art of selectively providing radiation from a radiation source through the test region to the radiation detectors may be utilized. The radiation source is otherwise surrounded by lead on all sides except for the side having the shutter. Shutters may be made of lead, tungsten or other radiation opaque materials.

The FIGURE also illustrates one method of scanning the radiation detectors, radiation sources and associated shutters across the test region and thereby moving the projectional view of the test region from which each radiation detector receives radiation. A rotatable platform 50 is shown with control mechanism 55 controlling the motion of the platform to select the projectional view of the test region from which each of the radiation detectors 20A through 20C will receive radiation. Through selectively controlling the positioning of platform 50 by means of control unit 55, the entire test region may be divided into a plurality of projectional views such that radiation measurements from the entire test region may be obtained. Each time the platform 50 moves, the control circuitry 55 opens the shutters to irradiate the test region with radiation. Thus data is obtained from the entire test region by rotating the platform 50 to select a new projectional view of the test region, obtaining data reflecting the emission of radiation from the selected projectional view of the test region, irradiating the test region with radiation and obtaining data of the radiation transmitted through the selected projectional view of the test region and then rotating the platform to select a new projectional view of the test region. This process of alternatingly providing radiation to the projectional views of the test region is repeated until the entire test region has been covered.

The output of the radiation detectors 20A through 20C is received by control logic 60 which determines whether the signal represents uncompensated emission data (the radiation emitted from the test region) or transmission data (both the radiation emitted from the test region and the radiation transmitted from the test region). This determination is made based upon the position of the shutters, when the shutter is open, mainly transmission data is received from the corresponding radiation receiver. When the shutter is closed uncompensated emission data is received from the corresponding radiation detector.

This transmission data and uncompensated emission data may then be transferred to compensation circuitry 70 such as illustrated in the FIGURE. This compensation circuitry then compensates the emission data for variations in attenuation based on the attenuation of a known source radiation transmitted through the test region. This attenuation compensation is reflected in the transmission data. In one embodiment of the present invention, the intensity of the transmission data is much larger than the uncompensated emission data, therefore the transmission data may be used directly to compensate the uncompensated emission data to produce compensated emission data. Transmission strengths of from about 5 to about 100 times the emission level of the test region may be used without compensating for the emission component of the transmission data. Optionally, the uncompensated emission data could be subtracted from the transmission data to produce offset transmission data. This offset transmission data could then be used to produce compensated emission data. Methods of compensating for variable attenuation in the test region based upon transmission data and uncompensated emission data are described in Gillan et al, IEEE Trans. Nucl. Sci., 38:761-766, 1991. As with the control logic described above, the compensation of the emission data may be carried out on digital computers known to one of skill in the art. The compensated emission data is then sent to a display unit 80 where the data from each of the projectional views of the test region is combined to produce a tomographic image of the test region.

In other embodiments of the present invention, the radiation sources 30A through 30C are point sources and the radiation detectors 20A through 20C have associated cone beam collimators. Other variations of radiation source and detector geometry known to those of skill in the art may be utilized, such as parallel beam sources.

In addition to the use of the shutters 40A through 40C to shield the radiation source from the radiation detectors, the shutters may be utilized to shape the radiation emission of the source. For example, rotating a slit window shutter to give greater radiation concentrations at the center than at the edges. Shaping of the radiation beam such as this allows for delivery of a higher incident radiation to areas of higher attenuation which can reduce overall exposure time and improve the quality of the transmission data.

In utilizing the above described embodiments of the present invention a test subject is placed between the radiation source and the radiation detectors. The subject is administered a radiopharmeceutical or radioimaging agent which migrates to the area of interest in the body, such as the heart. Typically, this radioimaging agent will contain Technetium 99 m ($Tc^{99m}$) or other radioisotopes. The radiation emitted from a first projectional view of the test subject is then measured, resulting in uncompensated emission data. The shutter of a radiation source, corresponding to the projectional view for which emission data was just obtained is then opened to allow for the transmission of radiation through the first projectional view of the test subject. While various radioisotopes may be utilized, the radiation source preferably utilizes a radioisotope with the same energy level (for example 140 keV for $Tc^{99m}$) or more preferably the same radioisotpe as the radioimaging agent (for example, $Tc^{99m}$). The radiation from the test subject is then measured while the shutter is open, resulting in transmission data. Optionally, at this point the compensated emission data for the first projectional view of the test subject may be calculated from the transmission data and the uncompensated emission data using traditional SPECT techniques. Then the radiation source and radiation detector are moved with respect to the test subject such that the radiation detector receives radiation from a second projectional view of the test subject. The radiation emitted from this second projectional view of the test subject is then measured to result in uncompensated emission data for the second projectional view. The shutter of the radiation source is then opened to irradiate the second projectional view of the test subject. The radiation detector then measures the radiation transmitted through the second projectional view of the test subject to result in transmission data for the second projectional view. Again, optionally, at this point the compensated emission data for the second projectional view of the test subject may be calculated from the transmission data and the uncompensated emission data using traditional SPECT techniques. This process is repeated until the entire test region of the test subject has been evaluated. The compensated emission data from each of the individual projectional views may then be combined to produce a tomographic image.

As described above, the compensation for the attenuation of the emission data is carried out prior to reorientation of the test subject with respect to the radiation detectors, however, this operation may be carried out after all of the data from the entire test region of the test subject is gathered. This would require the storing of the data from each projectional view for further use in determining the compensated emission data. Furthermore, as noted above, the transmission data may be compensated for the presence of emission data by subtracting from the transmission data the known uncompensated emission data, and then this compensated transmission data utilized for compensating the emission data. As described above the shutter is only opened once for each projectional view of the test region, however, the shutter may be opened any number of times prior to reorientation of the test subject.

The present invention was described herein as embodied in a three gamma camera SPECT system, however, the advantages of the present invention may be obtained in two camera or single camera systems as well.

The foregoing discussion is illustrative of the present invention, and is not to be construed as limiting thereof. The invention is defined by the following claims, with equivalents of the claims to be included therein.

That which is claimed is:

1. A method of single photon emission computed tomography of a test region having a plurality of projectional views utilizing a radiation source opposite said test region from a radiation detector, comprising:

detecting emitted radiation from a first projectional view of said plurality of projectional views to produce uncompensated emission data for said first projectional view;

irradiating said first projectional view with radiation from said radiation source to produce transmitted radiation through said first projectional view; and detecting the transmitted radiation and the emitted radiation from said first projectional view to produce transmission data for said first projectional view; then detecting emitted radiation from a second projectional view of said plurality of projectional views to produce uncompensated emission data for said second projectional view;

irradiating said second projectional view with radiation from said radiation source to produce transmitted radiation through said second projectional view; and detecting the transmitted radiation and the emitted radiation from said second projectional view to produce transmission data for said second projectional view.

2. The method of single photon emission computed tomography of claim 1 further comprising the step of compensating the uncompensated emission data for each projectional view with the transmission data for that respective projectional view.

3. The method of single photon emission computed tomography of claim 2 further comprising the step of producing a tomographic image from the compensated emission data.

4. The method of single photon emission computed tomography of claim 1 further comprising the step of offsetting said transmission data for a respective projectional view with the uncompensated emission data for that projectional view to produce offset transmission data for that projectional view.

5. The method of single photon emission computed tomography of claim 4 further comprising the step of compensating the uncompensated emission data for each projectional view with the offset transmission data for that respective projectional view.

6. The method of single photon emission computed tomography of claim 1 where uncompensated emission data and transmission data are obtained for each of the plurality of projectional views of the test region.

* * * * *

UNITED STATES PATENT AND TRADEMARK OFFICE
CERTIFICATE OF CORRECTION

PATENT NO. : 5,289,008
DATED : February 22, 1994
INVENTOR(S) : Ronald J. Jaszczak and David R. Gilland It is certified that error appears in the above-identified patent and that said Letters Patent is hereby corrected as shown below:

Column 1, Line 7, correct "National Institutes of Health" to read -- Department of Energy--.

Column 4, Line 54, correct "Gillan" to read -- Gilland --.

Signed and Sealed this

Twenty-seventh Day of September, 1994

Attest:

BRUCE LEHMAN

*Attesting Officer*      *Commissioner of Patents and Trademarks*